US007191537B2

(12) United States Patent
Kraus et al.

(10) Patent No.: US 7,191,537 B2
(45) Date of Patent: Mar. 20, 2007

(54) METHOD AND APPARATUS FOR LOCATING THE CENTER OF A CIRCLE

(76) Inventors: Andrew Patrick Kraus, 4374 Parkway Dr., Melbourne, FL (US) 32934; David Michael Peltz, 4374 Parkway Dr., Melbourne, FL (US) 32934

( * ) Notice: Subject to any disclaimer, the term of this patent is extended or adjusted under 35 U.S.C. 154(b) by 0 days.

(21) Appl. No.: 10/032,435

(22) Filed: Dec. 31, 2001

(65) Prior Publication Data

US 2003/0121164 A1 Jul. 3, 2003

(51) Int. Cl.
*G01D 21/00* (2006.01)

(52) U.S. Cl. ........................................................ 33/520

(58) Field of Classification Search .................. 33/520, 33/543, 544.5, 544.6, 555.1, 671, 670
See application file for complete search history.

(56) References Cited

U.S. PATENT DOCUMENTS 346,048 A * 7/1886 Humphrey ................... 33/520
575,469 A * 1/1897 Fancher ....................... 33/520
1,081,682 A * 12/1913 Lundstrom ................... 33/520
1,153,149 A * 9/1915 Abbott ........................ 33/520
2,642,672 A * 6/1953 Lewis et al. ............... 33/544.5
2,677,893 A * 5/1954 Wahl ........................... 33/520
2,780,874 A * 2/1957 Puckett ........................ 33/520
2,826,820 A * 3/1958 Zelnick ..................... 33/544.6
3,231,981 A * 2/1966 Welch ....................... 33/544.5
3,762,057 A * 10/1973 Kaifesh ..................... 33/544.6
3,975,830 A * 8/1976 Lopacki ....................... 33/520
4,596,074 A * 6/1986 Allen ........................ 33/555.1
4,848,757 A * 7/1989 De Fazio ..................... 33/520
5,074,051 A * 12/1991 Cordy et al. .................. 33/520
6,381,861 B1* 5/2002 Deterling .................. 33/555.1

* cited by examiner

*Primary Examiner*—G. Bradley Bennett
(74) *Attorney, Agent, or Firm*—Mark R. Malek; The Torpy Group, P.L.

(57) ABSTRACT

A method and apparatus that will locate the center of a circle in a single operation by positioning two points of registration at the edge of the circle relative to a third point of registration previously set at the edge of the circle where these points are held in accurate spatial relationship to each other and a fourth point of registration that in turn, indicates the center of the circle. By allowing precise registration and novel operation, this invention provides a simpler, more accurate means to locate the center of a circle that precludes the need to make extraneous marks on the circle being measured.

17 Claims, 3 Drawing Sheets

METHOD AND APPARATUS FOR LOCATING THE CENTER OF A CIRCLE

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The art of locating the center of a circle with a center finder, compass, or hermaphrodite caliper has long been known. The center finder has two surfaces forming an internal angle that is bisected by a straight edge. The circle to be measured is placed against the two surfaces and a line is scribed or drawn on the circle along the straight edge. The center finder is then rotated to a new location on the circumference of the circle. A second line is then drawn on the circle along the straight edge that intersects the first line at the center of the circle. The center finder is effective when measuring the circular end of a cylinder, but less effective for measuring circles drawn on a flat surface.

A compass may be used to find the center of a circle by first adjusting the angle of the compass so that the ends of the compass legs are approximately the radius of the circle. One of the compass legs is placed on the edge of the circle and an arc is drawn or scribed on the circle. The process is repeated with the leg of the compass positioned at a different location on the circle. If the arcs intersect at more than one point or do not intersect at all, the compass must be readjusted to where the arcs intersect at one point. This single point where the two arcs intersect is the center of the circle.

The use of the hermaphrodite caliper to find the center of a circle is similar to the compass, but is effective for measuring the circular end of a cylinder rather than a circle drawn on a flat surface. The curved end of the hermaphrodite caliper is placed against the edge of the cylinder with the caliper adjusted so the straight end is spaced as close to the center of the circle as possible. An arc is scribed or drawn on the circle by rotating the straight end of the caliper about the end placed against the edge of the cylinder. The caliper is then repositioned with the curved end placed at a different location against the edge of the cylinder and a second arc is scribed or drawn on the circle using the straight end. As with the compass, the caliper must be adjusted so that the two arcs intersect at only one point. This point is the center of the circle.

All of the above devices use the method of drawing or scribing intersecting lines or arcs to locate the center of a circle. There are drawbacks to this current state of the art method:

1. The current method requires multiple step operations. Each device must be placed against the edge of the circle at least twice at different locations in order to generate intersecting lines or arcs.
2. The current method may not be accurate depending on the type of circle being measured. The center finder is prone to errors if used to find the center of a circle drawn on a flat surface due to the difficulty in aligning the surfaces with the edge of the circle. The compass is extremely difficult to use for finding the center of the circular end of a cylinder as the first leg of the compass may tend to slip over the edge of the cylinder as the compass is rotated. The hermaphrodite caliper is prone to errors because the curved end that is placed against the circle edge may slip as the caliper is rotated.
3. The current method requires drawing or scribing lines or arcs on the circle being measured. Should it be objectionable that the circle has extraneous marks, another operation would be required to remove the lines or scribes.

BRIEF SUMMARY OF THE INVENTION

It is therefore the object of this invention to provide a simplified method of locating the center of a circle. It is a further object of this invention to provide a more accurate method of finding the center of a circle whether the circle is drawn on a flat surface or is the circular end of a cylinder. It is yet another object of the invention to provide a method of finding the center of a circle that does not require making marks on the circle being measured in order to find its center.

This invention is a method and apparatus that will locate the center of a circle in a single operation by positioning two points of registration at the edge of the circle relative to a third point of registration previously set at the edge of the circle where these points are held in accurate spatial relationship to each other and a fourth point of registration that in turn, indicates the center of the circle. By allowing precise registration and novel operation, this invention provides a simpler, more accurate means to locate the center of a circle that precludes the need to make extraneous marks on the circle being measured.

DETAILED DESCRIPTION OF THE INVENTION

The novel method consists of setting a first reference point at the edge of the circle to be measured and allowing a single continuous adjustment to be made which aligns at least two other points with the edge of the circle where such adjustment positions another point at the center of the circle by way of a mechanism that maintains accurate spatial relationship of all of the points.

The three mechanical embodiments described below show general types of apparatus that practice the novel method. One skilled in the art will appreciate, that many other configurations of these type apparatus can also practice the invention and still be within the spirit and scope of the claims. It will also be recognized by one skilled in the art that such apparatus may be automated by Electro-mechanical means. Positioning and maintaining the spatial relationship of the points may be performed by a motor or other actuator controlled by a microprocessor. The points that are positioned at the edge of the circle may be photo-detectors or other electronic indicators that provided signals to the microprocessor. The microprocessor would use this information to accurately position the edge locators and center indicator. This automated practice of the invention is also within the spirit and scope of the claims.

Figure 1A:
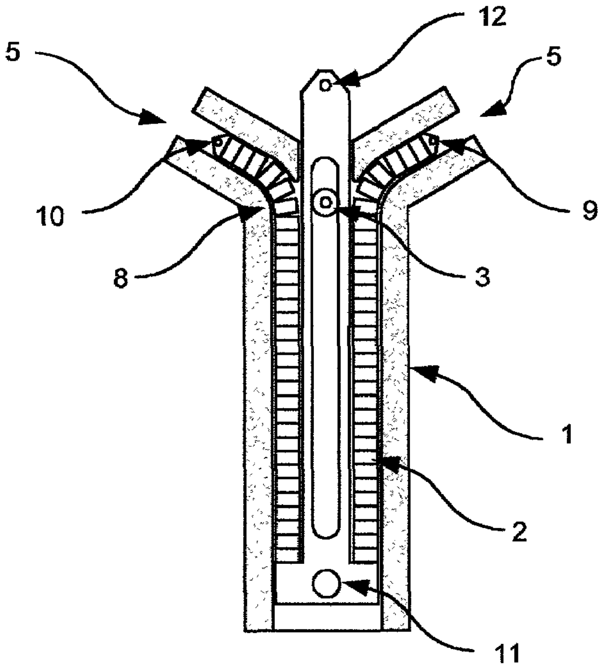
FIG. 1*a* illustrates all of the parts of the preferred embodiment in their assembled configuration.
Figure 1B:
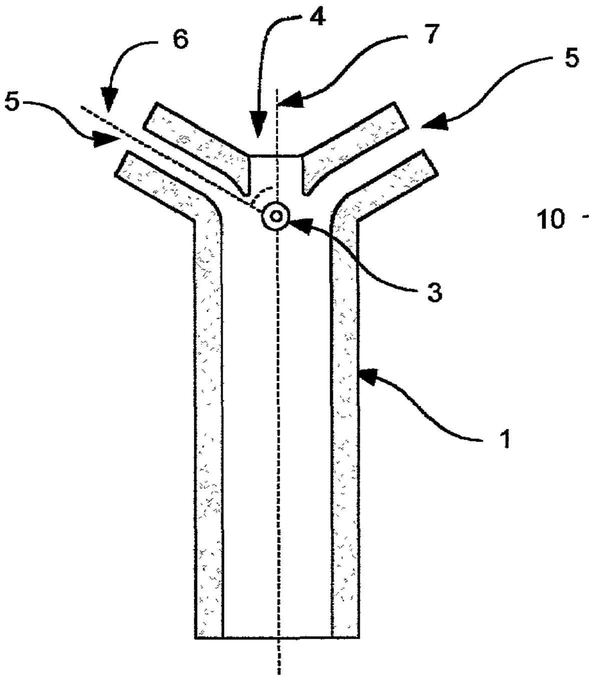
FIG. 1*b* shows one of the two components of the preferred embodiment.
Figure 1C:
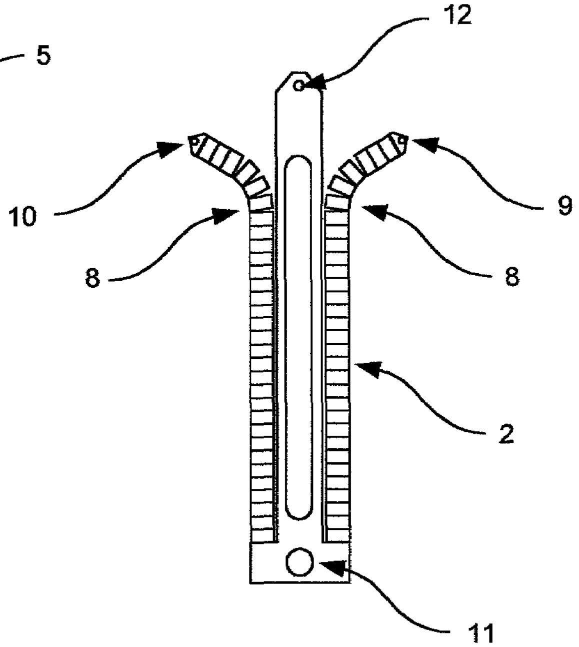
FIG. 1*c* shows the second of the two components of the preferred embodiment.

FIG. 1*a* shows the preferred exemplary mechanical embodiment of the invention. It is comprised of two general parts, a base member 1, shown by itself in FIG. 1*b,* and an extendable member 2, shown by itself in FIG. 1*c.*

Base member 1 has a pivot post 3 about which it can rotate freely. The pivot post 3 extends through the base member 1 and has an axial hole, is transparent, or has other means that allows the edge of the circle to be seen through the post. The bottom of pivot post 3 may be anti-slip and/or notched for use with a flat circle or end of a cylinder where such a notch is designed to align the edge of the cylinder with the center of the post. The center of the pivot post 3 establishes the first reference point on the edge of the circle to be measured. Base member 1 has a longitudinal cavity 4 running its length with lateral cavities 5 projecting at 60 degrees from either side of it. The lateral cavities are oriented such that the line 6 that bisects the lateral cavities 5 intersects the line 7 that bisects the longitudinal cavity 4 at the center of the pivot post 3 at 60 degrees. The lateral cavities 5 have curved surfaces as they intersect the longitudinal cavity 4 to smoothly redirect the flexible portions of the extendable member 2 as will be described later. The cavities in the base member 1 are sized to accept the extendible member 2 with close but non-interfering tolerance.

The extendible member 2 consists of a center solid longitudinal portion that has a longitudinal slot providing clearance for the pivot post 3 and longitudinal flexible portions 8 on either side. The flexible portions 8 are constructed such that they are normally straight yet can be redirected by the walls of the lateral cavities 5 as they move through them. After being redirected 60 degrees by and exiting from the lateral cavities 5, the flexible portions 8 return to a straight and rigid state. The flexible portions 8 of the extendable member 2 need only be flexible in one degree of freedom in order to be redirected the 60 degrees. Many embodiments of a flexible member with one degree of freedom may be employed such as the use of a tight spring or elastomeric material. An exemplary embodiment shown here is the use of solid segments affixed to the convexing side of a thin flexible material such as spring steel that will bend yet return to straight when the bending force from the walls of the lateral cavities 5 is not in effect. Holes, arrows, or other points of registration are located at the free end of the flexible portions 8 and are the circle edge locators 9 and 10. The circle edge locator 9 establishes the second reference point on the edge of the circle and edge locator 10 establishes the third. An adjust knob 11 or other means to allow the extendable member to be moved relative to the base member 1 is located at the posterior end of the extendable member 2. A hole, arrow, or other means of registration is located at the anterior end of the extendable member 2, and is the circle center indicator 12. With the circle center indicator 12 being a hole; a pencil, stylus, or other marking device may be inserted to mark just the center of the circle when the pivot post 3 and circle edge locators 9 and 10 are positioned at the edge of the circle.

The operation of this embodiment is as follows:

The pivot post 3 is place at the edge of a flat circle to be measured or against the edge of a cylinder to be measured. The operator may then hold the pivot post 3 in position by pressing it against the circle with a thumb. Using the thumb and forefinger of the other hand, the adjust knob may be pushed or pulled to extend or retract the extendable member 2, as well as rotate the combined base member 1/extendable member 2 assembly. As the extendable member 2 is pushed toward the anterior end of the base member 1, the flexible members are forced outward at 60 degrees by the walls of the lateral cavities 5. The center solid longitudinal portion is extended out of the longitudinal cavity 4 by this same action. The push and/or pull, and rotation is performed until the circle edge locators 9 and 10 are both positioned at the edge of the circle. When this alignment occurs, the circle center indicator 12 is precisely at the center of the circle.

Figure 2A:
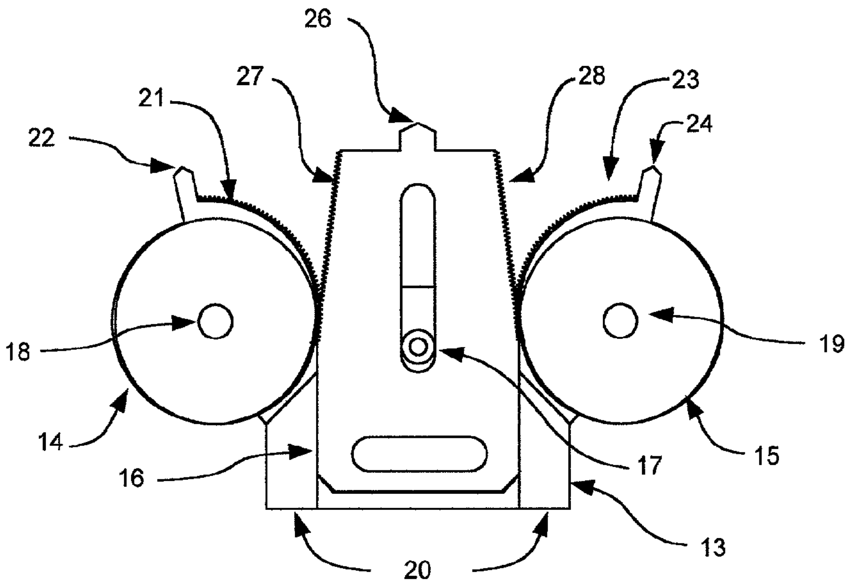
FIG. 2*a* illustrates all of the parts of a second embodiment in their assembled configuration.
Figure 2B:
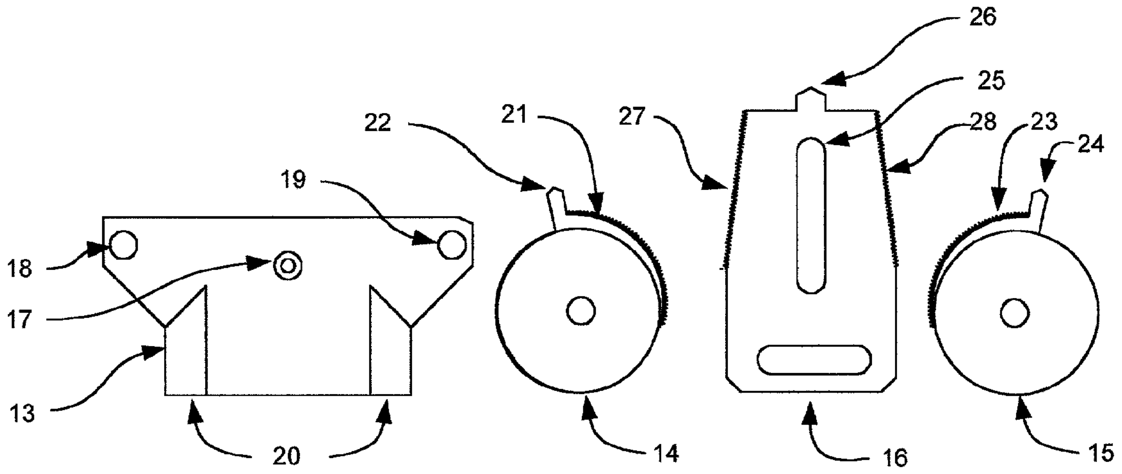
FIG. 2*b* shows the four components of the second embodiment separated for clarity.

A second embodiment, shown in FIG. 2*a,* is another apparatus that implements the present novel method of finding the center of a circle. This embodiment consists of the individual components shown in FIG. 2*b:* a base member 13, left rotatable arm 14, right rotatable arm 15, and an extendable member 16.

The base member 13 has a pivot post 17 about which it can rotate freely. The center of the pivot post 17 establishes the first reference point on the edge of the circle to be measured. The base member 13 also has a left rotatable arm pivot post 18 and a right rotatable arm pivot post 19 and extendable member guides 20.

The left rotatable arm 14 has complex curve gear teeth 21 and edge of circle locator 22. The right rotatable arm 15 is a mirror copy of the left rotatable arm 14 and has complex curve gear teeth 23 and edge of circle locator 24.

The extendable member 16 has a longitudinal slot 25 that accommodates the base member pivot post 17, and has a circle center locator 26 located at its anterior end. An adjust knob is located at the anterior end of the extendable member 16. On the left side of the anterior edge of the extendable member 16 is complex curve gear teeth 27. On the right side of the anterior edge of the extendable member 16 is complex curve gear teeth 28.

When assembled as in FIG. 2*a,* the rotatable arms 14 and 15 are located on and may rotate about pivot posts 18 and 19 respectively. The extendable member 16 is located between the extendable member guides 20. The extendible member complex curve gear teeth 27 and 28 engage the rotatable arms' complex curve gear teeth 21 and 23 respectively. The shape of the complex curve gear teeth 21 on the left rotatable arm 14 and the shape of the complex curve gear teeth 27 on the right side of the extendable member 16 are complimentary and have a geometry that results in continuous meshing of the gear teeth where the left rotatable arm circle edge locator 22 rotates to the edge of a given circle when the extendible member 16 is moved to where the circle center indicator 26 is at the center of the given circle when the pivot post 17 is also on the edge of the circle. The complex curve gear teeth 28 on the right rotatable arm 15 and the complex curve gear teeth 28 on the right side of the extendable member 16 mesh in the same fashion. An infinite number of complex curve geometry's will satisfy this relationship and depend on the distance from the center of the rotatable member to the edge locator and the position of the center of the rotatable member relative to the center of the pivot post.

Operation of this apparatus is similar to that of the preferred embodiment. The pivot post 17 is placed on the edge of a circle to be measured. The extendable member 16 is then pushed or pulled and rotated about pivot post 17 until the right and left rotatable circle edge locators, 22 and 24, are positioned at the edge of the circle. When this occurs, the circle center indicator 26 is at the center of the circle.

Figure 3:
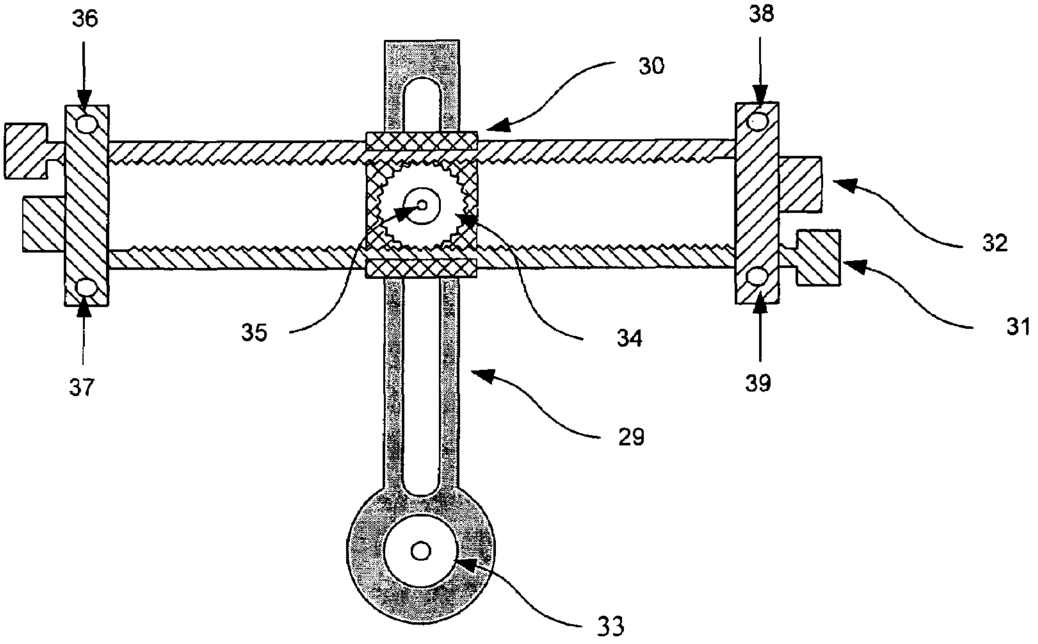
FIG. 3 illustrates all of the parts of a third embodiment in their assembled configuration.

A third embodiment is yet another apparatus that implements the present novel method of finding the center of a circle. This embodiment, shown in FIG. 3, consists of a base member 29, a rack and pinion slide 30, racks 31 and 32, pivot post 33, and pinion gear 34. The base member 29 contains a longitudinal slot and a hole that accommodates pivot post 33 about which it may rotate freely. The longitudinal outer surfaces on either side of the slot of the base member 29 are relatively smooth and parallel allowing the rack and pinion slide 30 to move freely in the longitudinal direction. The rack and pinion slide 30 has a hole, post, or other means to accommodate the pinion gear and has groves, rails, or other means to accommodate and hold the racks in proper relationship. The hole, post, or other means of accommodating the pinion gear 34 has a hole in the center, is transparent, or has some other means to indicate or mark the center of the circle and is center indicating point 35. The ends of the racks have holes, are transparent, or have other means to be circle edge locators 36, 37, 38, and 39. These circle edge locators are equidistant from the line that runs through the circle center locator 35 and is perpendicular to the longitudinal direction of the base member 29. To operate the third embodiment of the invention, the circle edge locators 36, 37, 38, and 39 are aligned with edges of the circle. Simultaneously therewith, the pivot post 33, having a passageway formed therethrough (as illustrated in FIG. 3) is aligned with an edge of the circle. Thereafter, the circle center locator 35 indicates the center of the circle.

What is claimed is:

1. A method for locating a center of a circle, the method comprising the steps of:

establishing a first point at an edge of the circle, by aligning a pivot post of a base member with a lower edge of the circle;

establishing second and third points at the edge of the circle by longitudinally extending an extendable member that engages the base member so that a pair of opposing members move responsive to movement of the extendable member to a position where circle edge locators positioned at respective ends of the opposing members are aligned with respective second and third edges of the circle; and maintaining a spatial relationship between the first, second, and third points so that the center of the circle is identified by a circle center indicator positioned at an end of the extendable member.

2. A method in accordance with claim 1 further comprising adjusting the spatial relationship between the first, second, and third points to the dimension of the circle, wherein adjusting comprises the steps of:

maintaining the first point at the edge of the circle; and longitudinally extending the extendable member to laterally extend the flexible members so that the passageways of the flexible members are aligned with the second point at the edge of the circle and the third point at the edge of the circle.

3. A method in accordance with claim 1 further comprising adjusting the spatial relationship between the first, second, and third points to the dimension of the circle, wherein adjusting comprises the steps of:

maintaining the first point at the edge of the circle; and engaging an adjust knob on the extendable member to longitudinally extend the extendable member and laterally extend the flexible members so that the passageways of the flexible members are aligned with the second point at the edge of the circle and the third point at the edge of the circle.

4. A method in accordance with claim 1 wherein the pivot post has a passageway formed therethrough.

5. A method in accordance with claim 1 wherein the pivot post remains stationary when the extendable member is extended.

6. A method in accordance with claim 1 wherein the opposing members move laterally responsive to longitudinal movement of the extendable member.

7. A method in accordance with claim 1 wherein each opposing member is defined by at least one of a flexible member and a rotatable member.

8. A method in accordance with claim 1 wherein the circle edge locators have passageways formed therethrough.

9. An apparatus for locating a center of a circle, said apparatus comprising:

a first component comprising a portion to be aligned with an edge of the circle to thereby define a first point;

a second component that engages said first component, said second component being defined as an extendable member having a pair of opposing flexible portions connected thereto, each flexible portion having a circle edge locator defined by a passageway formed through an end portion thereof, and a circle center indicator defined by a passageway formed through an end of the extendable member, the circle center indicator being positioned at the center of the circle when the circle edge locators and the portion of the first component are aligned with the respective edges of the circle.

10. An apparatus in accordance with claim 9 wherein said second component further comprises an adjust knob to laterally move the extendable member to position the circle center indicator at the center of a given circle within a range of circle sizes when the circle edge locators are moved to the edge of said given circle within the same said range of circle sizes.

11. An apparatus in accordance with claim 9 wherein the portion of said first component that defines the first point is a pivot post to be maintained at an edge of the circle while the extendable member is longitudinally moved to thereby laterally move flexible members and align the circle edge locators with respective edges of the circle so that the circle center indicator is positioned at the center of the circle when the pivot post and circle edge locators are at edges of the circle.

12. An apparatus in accordance with claim 9 wherein said first component is a base member, and wherein said extendable member slidably engages said base member.

13. An apparatus in accordance with claim 12 wherein said base member has a longitudinal cavity and a pair of opposing lateral cavities.

14. An apparatus in accordance with claim 13 wherein said lateral cavities extend outwardly from said longitudinal cavity at an angle of about 60 degrees.

15. An apparatus in accordance with claim 9 wherein said extendable member further comprises an adjust knob connected thereto.

16. An apparatus in accordance with claim 9 wherein said pivot post engages a longitudinally extending passageway formed through said extendable member.

17. An apparatus in accordance with claim 9 wherein said flexible portions are at least one of a spring and elastomeric material.

* * * * *